March 23, 1943.  A. T. RIEDI  2,314,633
FISH NET MOUNTING
Original Filed July 23, 1940    2 Sheets-Sheet 1
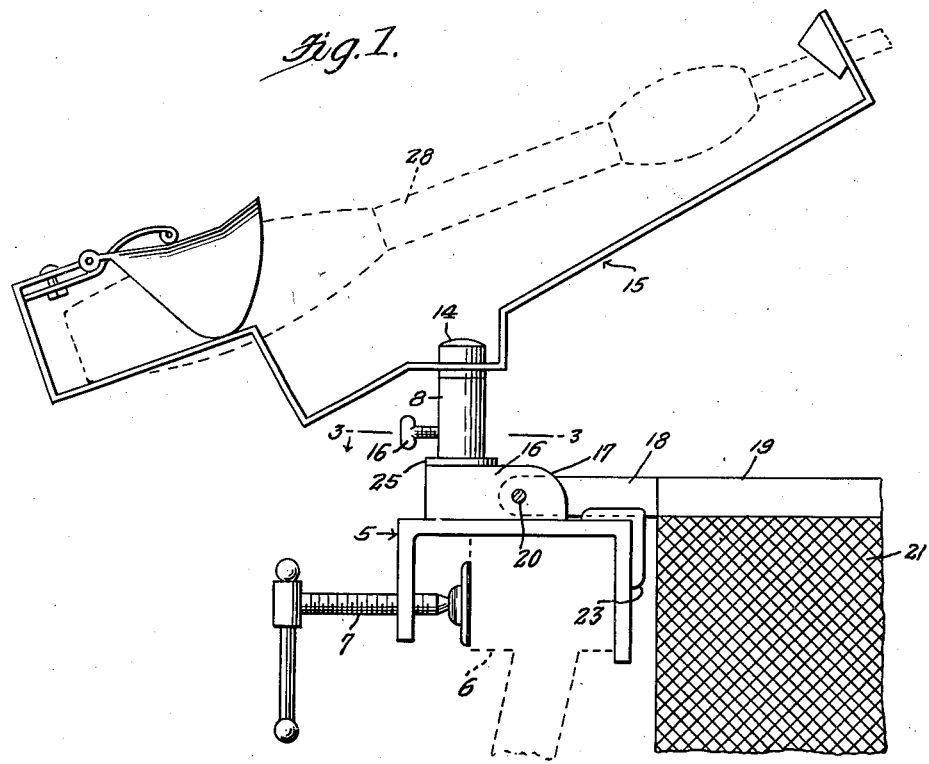
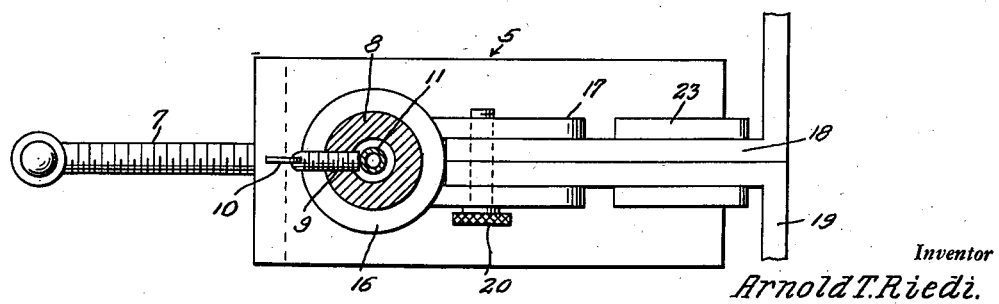
Inventor
Arnold T. Riedi.
By Clarence A. O'Brien
and Harvey B. Jacobson
Attorneys March 23, 1943.  A. T. RIEDI  2,314,633
FISH NET MOUNTING
Original Filed July 23, 1940  2 Sheets-Sheet 2
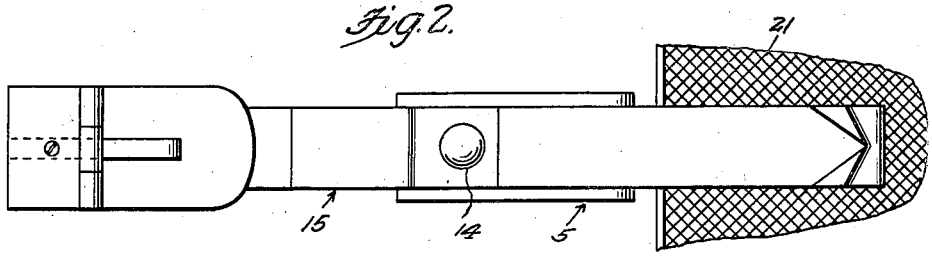
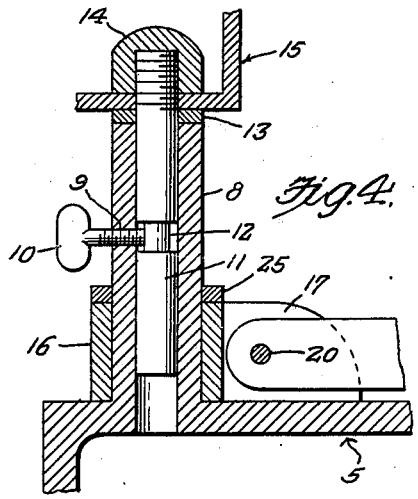
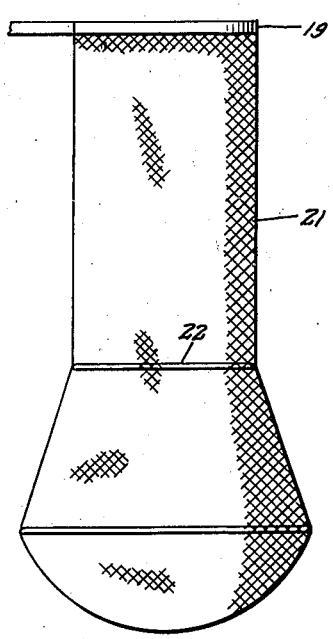
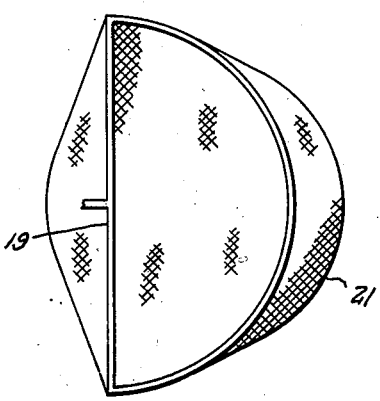
Inventor
Arnold T. Riedi.
By Clarence A. O'Brien
and Harvey B. Jackson, Attorneys Patented Mar. 23, 1943

2,314,633

UNITED STATES PATENT OFFICE 2,314,633

FISH NET MOUNTING

Arnold T. Riedi, Dubuque, Iowa

Original application July 23, 1940, Serial No. 347,026, now Patent No. 2,289,592, dated July 14, 1942. Divided and this application April 9, 1942, Serial No. 438,337

2 Claims. (Cl. 248—94)

This is a divisional application of my co-pending application Serial No. 347,026, filed July 23, 1940, now Patent. No. 2,289,592 dated July 14, 1942.

The present invention relates to new and useful improvements in fishing pole and fish net mounting and has for its primary object to provide an efficient and inexpensive device of this character for supporting a fish pole in proper position while still fishing or trolling and also includes the provision of a support for a fish net in the water in a manner for convenient removal out of the water into the boat, when desired, the construction of the device being such that either the fish pole or the net may be rotated in a complete circle and secured against rotation, when desired.

A further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a fragmentary side elevational view illustrating a fishing pole and fish net mounting constructed in accordance with my invention.

Figure 2 is a fragmentary top plan view illustrating the device.

Figure 3 is a sectional view taken substantially on a line 3—3 of Figure 1.

Figure 4 is a fragmentary vertical sectional view illustrating a portion of the mounting.

Figure 5 is a side elevational view of the fish net, and

Figure 6 is a top plan view thereof.

Referring now to the drawings in detail, the numeral 5 designates a U-clamp employed for mounting the present invention on the side or gunwale of a boat, a fragmentary portion of which is indicated by the character 6. The U-clamp 5 includes a clamping bolt 7.

Formed integrally with the U-clamp is a vertically arranged sleeve 8 provided with a screw-threaded opening 9 to receive a set bolt 10. A stem 11 is rotatably mounted in the sleeve and includes an annular groove 12 to receive the bolt 10 for rotatably securing and locking the stem 11 in the sleeve against rotation. The upper end of the stem is screw-threaded to receive thereon a washer 13 which rests upoon the upper end of the sleeve and a nut 14 for detachably securing on the upper end of the stem a pole holder designated generally at 15 and adapted for supporting the pole in an inclined position as shown by the dotted line 28 in Figure 1.

A cuff 16 is journaled on the sleeve and includes spaced ears 17 within which is pivotally received a shank 18 of a net-supporting hoop 19. The shank 18 is detachably and pivotally connected to the ears 17 as shown at 20. The hoop 19 is of half-round shape and has removably mounted thereon a fish net or bag 21 including a series of hoops 22 similarly shaped to the hoop 19 for supporting the bag or net throughout its length and it is preferable that the latter be slightly larger towards its lower end than its mouth or upper end so as to accommodate a large number of fish without crowding.

When the net or bag is in use for supporting fish within the water, the shank 18 of the hoop 19 rests upon the U-clamp, the latter being provided with spaced reinforcing ribs 23 between which is located the shank 18 to prevent the cuff 16 from rotating on the sleeve 8. This construction will permit the bag or net to be swung upwardly and rotated about the sleeve 8 to assume a position within the boat. When the bag or net is arranged in the water, the flatside thereof is disposed next to the side of the boat so as to be convenient for placing fish therein.

A collar 25 is secured on the sleeve 8 to prevent the cuff 16 from sliding upwardly on the sleeve.

It is believed the details of construction, operation and advantages of the device will be readily understood from the foregoing without further detailed explanation.

Having thus described the invention what I claim is:

1. In a device of the character described, a U-clamp, a member integral with and rising from said clamp, a cuff journaled on said member and including spaced ears projecting radially from the cuff, and a fish net including a hoop and a shank integral therewith and received between and pivoted to said ears.

2. In a device of the character described, a U-clamp, a member integral with and rising from said clamp, a cuff journaled on said member and including spaced ears, a fish net including a hoop and a shank integral therewith and received therebetween and pivoted to said ears, reinforcing ribs formed on said clamp and spaced to receive the shank for securing the fish net against rotation on the member.

ARNOLD T. RIEDI.